United States Patent
Wolfer et al.

(10) Patent No.: US 6,441,086 B1
(45) Date of Patent: Aug. 27, 2002

(54) SILICONE RUBBER

(75) Inventors: Dietrich Wolfer, Oberndorf (AT); Wilhelm Marsch, Haiming (DE)

(73) Assignee: Wacker - Chemie GmbH, Munich (DE)

(*) Notice: Subject to any disclaimer, the term of this patent is extended or adjusted under 35 U.S.C. 154(b) by 0 days.

(21) Appl. No.: 09/493,777

(22) Filed: Jan. 28, 2000

(30) Foreign Application Priority Data

Feb. 4, 1999 (DE) .......................... 199 04 510

(51) Int. Cl.[7] .............................. C01M 107/50
(52) U.S. Cl. .................. 524/588; 524/81; 528/8; 528/13; 528/25; 528/33; 264/142
(58) Field of Search .................. 524/81, 183, 184, 524/265, 266, 588; 528/8, 13, 35; 264/142; 11/11

(56) References Cited

U.S. PATENT DOCUMENTS

| | | | |
|---|---|---|---|
| 3,715,334 A | 2/1973 | Karstedt | |
| 3,722,240 A | 3/1973 | Spain et al. | |
| 3,775,452 A | 11/1973 | Karstedt | |
| 3,814,730 A | 6/1974 | Karstedt | |
| 3,919,136 A * | 11/1975 | Smith | 260/9 |
| 4,172,871 A | 10/1979 | Elsworth | |
| 4,394,317 A | 7/1983 | McAfee et al. | |
| 5,057,151 A | 10/1991 | Schuster et al. | |
| 5,693,596 A * | 12/1997 | Kaburagi et al. | 508/143 |
| 6,111,016 A * | 8/2000 | Katayama et al. | 525/92 E |

FOREIGN PATENT DOCUMENTS

GB    2 045 791 A    11/1980

OTHER PUBLICATIONS

Patent Abstracts of Japan, vol. 1997, No. 10, Oct. 31, 1997 & JP 09 14 33 70 A (Toray Dow Corning Co. Ltd.) Mar. 06, 1997.
Patent Abstracts of Japan, vol. 1995, No. 11, Dec. 26, 1995 & JP 07 207 161 A (Toshiba Silicon Co. Ltd.) Aug. 8, 1995.
International Search Report—Apr. 20, 2000.

* cited by examiner

*Primary Examiner*—Robert Dawson
*Assistant Examiner*—Christopher M. Keehan
(74) *Attorney, Agent, or Firm*—Brooks & Kushman P.C.

(57) ABSTRACT

The invention relates to compositions which can be prepared from at least one polyorganosiloxane, boric acid and water, and which may serve as a pelletizing additive for crosslinkable silicone rubber formulations. A small proportion of the pelletizing additive, when added to a ore component crosslinkable silicone rubber, or to individual components of a two or more component silicone rubber formulation, allow production of free flowing pellets which retain storage stability for extended periods of time.

25 Claims, No Drawings

SILICONE RUBBER

BACKGROUND OF THE INVENTION

1. Field of the Invention

The invention relates to a pelletizing additive for silicone rubber compositions, to a process for preparing the additive, to a pelletized silicone rubber material containing the additive, and to a process for preparing the pelletized material.

2. Description of the Related Art

There has been a longfelt need to provide pelletized silicone rubber. Such products are important, for example, for use in automated extrusion or injection molding processes. A problem is that it has not been possible to pelletize untreated silicone rubber since the untreated rubber clogs the pelletizing die or the knife.

U.S. Pat. No. 4,172,871 discloses the production of silicone rubber pellets, but the silicone rubber pellets adhere to one another in the untreated state. This adherence problem is solved by the '871 patentee by coating the pellets, for example with mica or talc.

BRIEF SUMMARY OF THE INVENTION

An object of the present invention is to improve upon the prior art silicone rubber pellets, and in particular to provide a pelletized material which has free-flowing properties and does not require surface-treatment with substances which, in some circumstances, could cause processing or performance difficulties. These and other objects are achieved by the present invention.

DETAILED DESCRIPTION OF THE INVENTION

The invention provides a pelletizing additive composition which is prepared from at least one polyorganosiloxane, boric acid and water, and silicone rubber formulations containing such a composition as a pelletizing additive.

The polyorganosiloxanes are preferably linear polyorganosiloxanes, such as dimethylpolysiloxanes, phenylmethylpolysiloxanes, trifluoropropylpolysiloxanes or ethylpropylpolysiloxanes having a viscosity of from 10,000 to $9 \times 10^6$ mPa·s, preferably from 100,000 to $8 \times 10^6$ mPa·s and in particular from $6 \times 10^6$ mPa·s to $8 \times 10^6$ mPa·s. The polyorganosiloxane(s) preferably comprise from 30 to 90% by weight, more preferably from 40 to 80% by weight, and most preferably from 60 to 70% by weight, of the composition.

Boric acid preferably comprises from 2 to 20% by weight, more preferably from 3 to 14% by weight, and most preferably from 8 to 9% by weight, of the composition.

Preferably, the novel composition further comprises fatty acid salts. The fatty acid salts are preferably salts of the metals Al, Ba, Ca, Cd, Co, Cr, Cu, Fe, Li, Mg, Mn, Ni, Pb, Sn, Sr, or Zn with higher fatty acids, resin acids or naphthenic acids, for example stearates, palmitates, oleates, linoleates, resinates, laurates, octanoates, ricinolates, 12-hydroxystearates, naphthenates, tallates and the like. Preference is given to fatty acids having from greater than 12 to 30 carbon atoms, particularly to fatty acids having from greater than 16 to 26 carbon atoms, and most preferably stearates, especially calcium stearate. The composition preferably contains 1 to 10% by weight, more preferably from 2 to 6% by weight, and most preferably from 3 to 4% by weight, of the fatty acid salts.

The invention also provides a process for preparing the novel composition, where the components polyorganosiloxane, boric acid and water are mixed. In this aspect of the invention, the abovementioned components polyorganosiloxane, boric acid and preferably deionized water, and, if desired, from 8 to 60% by weight, preferably from 15 to 50% by weight, and more preferably from 25 to 40% by weight, of silica produced pyrogenically in the gas phase and having a surface area of from 150 to 300 m²/g, or precipitated silicic acid, are mixed together. Kneading is preferably carried out for from 2 to 4 hours, preferably at a temperature of from 120 to 190° C., and preferably under an atmosphere of nitrogen. The water which serves here as solvent for the boric acid is drawn off as a vapor.

The resultant composition serves as an additive for producing a pelletized material made from silicone rubber. This silicone rubber may be a peroxidically crosslinking or an addition-crosslinking silicone rubber. Surprisingly, this additive allows production of a pelletized silicone rubber material which has full free-flowing properties. The amounts of this additive added to the silicone rubber are preferably from 0.1 to 4% by weight, more preferably from 0.4 to 2% by weight, and most preferably from 0.8 to 1.2% by weight.

The novel silicone rubber is preferably a peroxidically crosslinking polyorganosiloxane material, which preferably comprises the following components.

Polyorganosiloxanes made of units of the general formula

$$R_r SiO_{\frac{4-r}{2}}, \qquad (I)$$

where

R is identical or different and is an unsubstituted or substituted hydrocarbon radical and r is 0, 1, 2 or 3 and has an average numerical value of from 1.9 to 2.1.

Examples of hydrocarbon radicals R are alkyl radicals such as the methyl, ethyl, n-propyl, isopropyl, n-butyl, isobutyl, tert-butyl, n-pentyl, isopentyl, neopentyl and tert-pentyl radicals; hexyl radicals such as the n-hexyl radical, heptyl radicals such as the n-heptyl radical; octyl radicals such as the n-octyl radical, and isooctyl radicals, such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as cyclopentyl, cyclohexyl and cycloheptyl radicals and methylcyclohexyl radicals; aryl radicals such as the phenyl, biphenyl, naphthyl, anthryl and phenanthryl radicals; and alkaryl radicals such as o-, m-, and p-tolyl radicals, xylyl radicals and ethylphenyl radicals; aralkyl radicals, such as the benzyl radical and the α- and β-phenylethyl radicals.

Examples of substituted hydrocarbon radicals R are halogenated alkyl radicals such as the 3-chloropropyl radical, the 3,3,3-trifluoropropyl radical, and the perfluorohexylethyl radical, and halogenated aryl radicals such as the p-chlorophenyl radical and the p-chlorobenzyl radical.

The radicals R are preferably hydrocarbon radicals having from 1 to 8 carbon atoms, most preferably the methyl radical. Other examples of radicals R are the vinyl, allyl, methallyl, 1-propenyl, 1-butenyl and 1-pentenyl radicals, the 5-hexenyl, butadienyl, hexadienyl, cyclopentenyl, cyclopentadienyl, cyclohexenyl, ethynyl, propargyl and 1-propynyl radicals. The radicals R are preferably alkenyl radicals having from 2 to 8 carbon atoms, most preferably the vinyl radical. Among unsubstituted or substituted hydrocarbon radicals having from 1 to 8 carbon atoms, particular preference is given to the methyl, vinyl, phenyl and 3,3,3-trifluoropropyl radicals.

There are preferably alkyl radicals, most preferably methyl radicals, bonded to at least 70 mol % of the Si atoms present in the polyorganosiloxane (A) made of units of the formula (I). If the polyorganosiloxanes contain, besides Si-bonded methyl and/or 3,3,3-trifluoropropyl radicals, Si-bonded vinyl and/or phenyl radicals, the amounts of the latter are preferably from 0.001 to 30 mol %.

The polyorganosiloxanes (A) are preferably composed predominantly of diorganosiloxane units. The end groups of the polyorganosiloxanes may be trialkylsiloxy groups, in particular the trimethylsiloxy radical or the dimethylvinylsiloxy radical. However, it is also possible for one or more of these alkyl groups to have been replaced by hydroxyl groups or by alkoxy groups, such as methoxy or ethoxy radicals. The polyorganosiloxanes (A) may be liquids or highly viscous substances. The viscosity of the polyorganosiloxanes (A) is preferably from $10^3$ to $10^8$ MPa·s at 25° C. It is possible to use either just one type of polyorganosiloxane (A) or a mixture of at least two different types of polyorganosiloxanes (A).

The crosslinking agents preferably used in the novel silicone rubber materials are peroxides, such as dibenzoyl peroxide, bis(2,4-dichlorobenzoyl) peroxide, dicumyl peroxide or 2,5-bis(tert-butylperoxy)-2,5-dimethylhexane, or mixtures of these, preferably a mixture of bis(2,4-dichlorobenzoyl) peroxide and 2,5-bis(tert-butylperoxy)-2,5-dimetylhexane. Another preferred crosslinking agent is a mixture of bis-4-methylbenzoyl peroxide (PMBP) and 2,5-dimethyl-2,5-di-tert-butylperoxyhexane (DHBP) in a ratio of from 1:0.4 to 0.5:1, preferably in a ratio of 1:0.4.

The polyorganosiloxanes (A) according to the invention also preferably comprise reinforcing and/or nonreinforcing fillers. Examples of reinforcing fillers are pyrogenic or precipitated silicas with BET surface areas of at least 50 $m^2/g$.

The silica fillers mentioned may have hydrophilic character or may have been hydrophobicized by known processes. Reference may be made here, for example, to DE 38 39 900 A (Wacker-Chemie GmbH; application date Nov. 25, 1988) or to the corresponding U.S. Pat. No. 5,057,151. The hydrophobicization generally takes place using from 1 to 20% by weight of hexamethyldisilazane and/or divinyltetramethyldisilazane and from 0.5 to 5% by weight of water, based in each case on the total weight of the polyorganosiloxane material. These reagents are preferably added to an initial charge of the polyorganosiloxane (A) in a suitable mixing apparatus, e.g. a kneader or internal mixer, prior to incorporating the hydrophilic silica gradually into the material.

Examples of nonreinforcing fillers are powdered quartz, diatomaceous earth, calcium silicate, zirconium silicate, zeolite, metal oxide powders, such as aluminum oxide, titanium oxide, iron oxide, or zinc oxide, barium silicate, barium sulfate, calcium carbonate, calcium sulfate and polytetrafluoroethylene powder. Other fillers which may be used are fibrous components, such as glass fibers and synthetic polymer fibers. The BET surface area of these fillers is preferably less than 50 $m^2/g$.

The novel polyorganosiloxane materials which can be crosslinked to give elastomers preferably comprise from 1 to 200 parts by weight, more preferably from 30 to 100 parts by weight of filler (B), based in each case on 100 parts by weight of polyorganosiloxane (A).

Depending on the particular application, additives (C), for example processing aids such as plasticizers, pigments, or stabilizers such as thermal stabilizers, may be added to the novel polyorganosiloxane materials which can be vulcanized to give elastomers.

Examples of plasticizers which can be used as additives (C) are polydimethylsiloxanes with a viscosity of not more than 1000 $mm^2/s$ at 25° C. and having trimethylsilyl and/or hydroxyl terminal groups, or biphenylsilanediol.

Examples of thermal stabilizers which can be used as additives (C) are transition metal salts of fatty acids, such as iron octoate, cerium octoate and titanium bythylate, transition metal silanolates, such as iron silanolate, and also cerium(IV) compounds, and oxides, e.g. iron oxide and titanium oxide and mixtures of these.

In the case of each of the components used to prepare the novel materials, a single type of a given component may be used, or else a mixture of at least two different types of that component. The novel pelletizing aids preferably comprise no other substances other than those previously described.

The amount of the novel additive added to this peroxidically crosslinked silicone rubber is preferably from 0.1 to 4% by weight, more preferably from 0.4 to 2% by weight, and most preferably from 0.8 to 1.2% by weight. Pelletization follows, using conventional means of pelletizing, e.g. a pelletizing die and rotating knife, giving a fully free-flowing pelletized material.

An addition-crosslinking polyorganosiloxane material is preferred for the silicone rubber. All of the abovementioned substances except the peroxidic crosslinking agent may also be used with the addition-crosslinking polyorganosiloxane materials. In the case of the polyorganosiloxane rubber materials which cure via hydrosilylation at an elevated temperature to give elastomers, polyorganosiloxanes (D) having Si-bonded hydrogen atoms and hydrosilylation catalysts (E) are also present.

The polyorganosiloxane crosslinking agents (D) may be linear, cyclic or branched, and preferably contain at least 3 Si-bonded hydrogen atoms. The polyorganosiloxanes (D) used are preferably polyorganosiloxanes of the general formula (II)

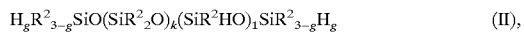  (II), where $R^2$ is as defined for R, g is 0 or 1, and each of k and l is 0 or an integer from 1 to 100.

Examples and preferred examples for the radicals $R^2$ have been listed above in the examples for the radicals R. The radicals $R^2$ are preferably saturated alkyl radicals or phenyl radicals.

Each of k and l is preferably 0 or an integer from 1 to 50. The sum of k and l is preferably from 1 to 50, in particular from 1 to 20.

Particular examples of polyorganosiloxanes (D) are copolymers made of dimethylhydrogensiloxane units, methylhydrogensiloxane units, dimethylsiloxane units and trimethylsiloxane units, copolymers made of trimethylsiloxane units, dimethylhydrogensiloxane units and methylhydrogensiloxane units, copolymers made of trimethylsiloxane units, dimethylsiloxane units and methylhydrogensiloxane units, copolymers made of methylhydrogensiloxane units and trimethylsiloxane units, copolymers made of methylhydrogensiloxane units, diphenylsiloxane units and trimethylsiloxane units, copolymers made of methylhydrogensiloxane units, dimethylhydrogensiloxane units and diphenylsiloxane units, copolymers made of methylhydrogensiloxane units, phenylmethylsiloxane units, trimethylsiloxane units and/or dimethylhydrogensiloxane units, copolymers made of methylhydrogensiloxane units, dimethylsiloxane units, diphenylsiloxane units, trimethylsiloxane units and/or dimethylhydrogensiloxane units, and also copolymers made of dimethylhydrogensiloxane units, trimethylsiloxane units, phenylhydrosiloxane units, dimethylsiloxane units and/or phenylmethylsiloxane units.

The amount of polyorganosiloxane (D) used is preferably sufficient to supply from 0.5 to 6 gram atoms, more preferably from 1 to 3 gram atoms, and most preferably from 1.5 to 2.5 gram atoms of Si-bonded hydrogen atom per mole of ethylenically unsaturated bonds in the radicals $R^1$ of the polyorganosiloxane (A).

The hydrosilylation catalyst (E) used may in principle be any catalyst conventionally used in addition-crosslinking silicone rubber materials. These include the elements and compounds of platinum, rhodium, palladium, ruthenium and iridium, preferably platinum. The transition metals may, if desired, have been fixed on finely divided support materials such as active carbon, metal oxides such as aluminum oxide, or on pyrogenically prepared silicon dioxide.

Preference is given to the use of platinum and platinum compounds. Particular preference is given to platinum compounds soluble in polyorganosiloxanes. Examples of soluble platinum compounds which may be used are the platinum-olefin complexes of the formulae $(PtCl_2.olefin)_2$ and $H(PtCl_3.olefin)$, preferably using alkenes having from 2 to 8 carbon atoms, such as ethylene, propylene or isomers of butene or of octene, or cycloalkenes having from 5 to 7 carbon atoms, such as cyclopentene, cyclohexene or cycloheptene. Other soluble platinum catalysts are the platinum-cyclopropane complex of the formula $(PtCl_2.C_3H_6)_2$, the reaction product of hexachloroplatinic acid with alcohols, with ethers or with aldehydes or with mixtures of these, or the reaction products of hexachloroplatinic acid with methylvinylcyclotetrasiloxane in the presence of sodium bicarbonate in ethanolic solution. Preference is given to finely divided platinum on support materials such as silicon dioxide, aluminum oxide, or activated wood charcoal or animal charcoal; to platinum halides such as $PtCl_4$, hexachloroplatinic acid and $Na_2PtCl_4.nH_2O$; platinum-olefin complexes, e.g. those with ethylene, propylene or butadiene; platinum-alcohol complexes; platinum-styrene complexes as described in U.S. Pat. No. 4,394,317; platinum-alcoholate complexes; platinum-acetylacetonates; reaction products prepared from chloroplatinic acid and monoketones, e.g. cyclohexanone, methyl ethyl ketone, acetone, methyl n-propyl ketone, diisobutyl ketone, acetophenone or mesityl oxide; and platinum-vinylsiloxane complexes as described, for example, in U.S. Pat. Nos. 3,715,334, 3,775,452 and 3,814,730, such as platinum-divinyltetramethyldisiloxane complexes with or without detectable amounts of inorganic halogen; all in amounts sufficient to promote the curing of the composition at a temperature of up to about 250° C., where the organohydrogensiloxane and the hydrosilylation catalyst are initially in different parts of the two or more component curable composition. Particular preference is given to complexes of platinum with vinylsiloxanes, such as sym-divinyltetramethyldisiloxane.

The hydrosilylation catalyst (IV) may also be used in microencapsulated form, in which case the catalyst is present in a finely divided solid insoluble in polyorganosiloxane, for example a thermoplastic (polyester resins, silicone resins). The hydrosilylation catalyst used may also be in the form of an inclusion compound, for example in a cyclodextrin.

The amount of hydrosilylation catalyst used depends on the desired rate of crosslinking and also on economic factors. When the common platinum catalysts are used, the content of platinum metal in the curable silicone rubber material is in the range from 0.1 to 500 ppm by weight (ppm=parts per million parts), preferably from 10 to 100 ppm by weight, of platinum metal. If desired, the catalyst may also be used together with an inhibitor, preferably in amounts of from 0.01 to 5% by weight.

A preferred preparation for an addition-crosslinking HTV silicone rubber is carried out as follows:

75 parts of a dipolyorganosiloxane end-capped by trimethylsiloxy groups, and consisting of 99.7 mol % of dimethylsiloxane units and 0.3 mol % of vinylmethylsiloxane units, having a viscosity of $8\times10^6$ mPa·s at 25° C., and 25 parts of a polydiorganosiloxane end-capped by trimethylsiloxy groups, consisting of 99.4 mol % of dimethylsiloxane units and 0.6 mol % of vinylmethylsiloxane units, having a viscosity of $8\times10^6$ mPa·s at 25° C., are mixed in a kneader at 150° C. with 45 parts of silicon dioxide produced pyrogenically in the gas phase having a BET surface area of 300 $m^2/g$, and 7 parts of a dimethylpolysiloxane having one Si-bonded hydroxyl group in each terminal unit, having a viscosity of 40 mPa·s at 25° C., and kneaded for 2 hours. After cooling the mixture to room temperature, 5 ppm by weight of platinum, in the form of a 1% strength solution of hexachloroplatinic acid in isopropanol, and 0.2 ppm by weight of benzotriazole are admixed, the ppm by weight figures in each case being based on the entire weight of the mixture described above. A portion of a methylhydrogenpolysiloxane end-capped with trimethylsiloxy groups and having a viscosity of 20 mPa·s at 25° C. is then added to the mixture.

The novel additive, preferably in an amount from 0.1 to 4% by weight, more preferably from 0.4 to 2% by weight, and most preferably from 0.8 to 1.2% by weight, is added to the addition-crosslinking silicone rubber. Pelletization follows using conventional means of pelletizing, such as a pelletizing die and a rotating knife, giving a fully free-flowing pelletized material.

The advantage of the novel additive is that a fully free-flowing pelletized material is obtained without adding pyrogenic silicon dioxide. The purpose of the addition of pyrogenic silicon dioxide has been to reduce the tack of the silicone rubbers, which per se are tacky. The storage stability of mixtures of this type is no more than 24 hours, since the rubber stiffens completely within a few hours. The novel pelletized silicone rubber material of the present invention, however, has a storage stability of at least 6 months, and therefore can be satisfactorily processed throughout this period.

EXAMPLE 1

Preparation of the Additive 100 parts of a dimethylpolysiloxane with a viscosity of $8\times10^6$ mPa·s are mixed in a kneader with 13 parts of boric acid, 46 parts of silicon dioxide produced pyrogenically in the gas phase and having a surface area of 150 $m^2/g$, 5 parts of calcium stearate, and 30 parts of deionized water and kneaded for 3 hours at 150° C. under nitrogen. During this time, the water serving as solvent for the boric acid is drawn away.

EXAMPLE 2
Preparation of the Peroxidically Crosslinking Silicone Rubber 100 parts of a diorganopolysiloxane end-capped with trimethylsiloxy groups, consisting of 99.93 mol % of dimethylsiloxane units and 0.07 mol % of vinylmethylsiloxane units and having a viscosity of $8 \times 10^6$ mPa·s at 25° C., are mixed in a kneader operated at 150° C., first with 50 parts of silicon dioxide produced pyrogenically in the gas phase, having a surface area of 200 m$^2$/g, then with 1 part of dimethylpolysiloxane end-capped with trimethylsiloxy groups and having a viscosity of 96 mPa·s at 25° C., then with 7 parts of a dimethylpolysiloxane having an Si-bonded hydroxyl group in each terminal unit and having a viscosity of 40 mPa·s at 25° C., then again with 1 part of dimethylpolysiloxane end-capped with trimethylsiloxy groups and having a viscosity of 96 mPa·s at 25° C., and finally with 2.8 parts of a paste made of equal parts of bis(2,4-dichlorobenzoyl) peroxide and of a dimethylpolysiloxane end-capped with trimethylsiloxy groups, having a viscosity of 250 mPa·s at 25° C. Added to the kneader is then 0.8% of the additive of Example 1, and the mixture is processed without difficulty to give a fully free-flowing pelletized material. The production equipment for pelletization is an extruder with a rotating knife on the die.

Comparative Example 1

Example 2 is repeated without the novel additive. The resultant silicone rubber cannot be pelletized, but simply clogs the pelletizing die and knife.

EXAMPLE 3
Preparation of the Addition-crosslinking Silicone Rubber
Preparation of Component A 75 parts of a diorganopolysiloxane end-capped with trimethylsiloxy groups and consisting of 99.7 mol % of dimethylsiloxane units and 0.3 mol % of vinylmethylsiloxane units having a viscosity of $8 \times 10^6$ mPa·s at 25° C., and 25 parts of a diorganopolysiloxane end-capped with trimethylsiloxy groups, consisting of 99.4 mol % of dimethylsiloxane units and 0.6 mol % vinylmethylsiloxane units having a viscosity of $8 \times 10^6$ mPa·s at 25° C., are mixed in a kneader operated at 150° C. with 45 parts of silicon dioxide produced pyrogenically in the gas phase having a BET surface area of 300 m$^2$/g, and 7 parts of a dimethylpolysiloxane having a Si-bonded hydroxyl group in each terminal unit, having a viscosity of 40 mPa·s at 25° C., and kneaded for 2 hours.

0.19 g of a platinum catalyst, composed of 97 parts by weight of a polydimethylsiloxane and 3 parts by weight of a platinum-divinyltetramethyldisiloxane complex, and 0.07 parts by weight of ethynylcyclohexanol as an inhibitor, are added to 100 parts by weight of the initial silicone mixture after cooling the material to room temperature, and homogenized in a kneader.
Preparation of Component B A mixture is prepared as described under component A, except that, after cooling the material to room temperature, 4 parts by weight of a polydimethylsiloxane-co-hydromethylpolysiloxane and 0.03 parts by weight of ethynylcyclohexanol, as inhibitor, are added to 100 parts by weight of this initial silicone mixture, instead of the platinum catalyst and inhibitor.

Each of component A and component B is mixed with 0.8% of the additive of Example 1, homogenized in a kneader, and processed without difficulty to give fully free-flowing pelletized materials. The production equipment for this is an extruder with a rotating knife on the die.

Comparative Example 2

Example 3 is repeated without adding the novel additive. The resultant silicone rubber components cannot be pelletized, but simply clog the pelletizing die and knife.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The novel compositions preferably contain only the previously described components. The terms "a" and "an" mean "one or more" unless indicated to the contrary.

What is claimed is:

1. An additive composition suitable for incorporation as a pelletizing aid into a curable silicone rubber formulation, said composition prepared by admixing ingredients comprising a polyorganosiloxane, boric acid, a fatty acid salt, and water.

2. The additive composition of claim 1, wherein said polyorganosiloxane is present in an amount of 30 to about 90 weight percent based on the total weight of the additive.

3. The additive composition of claim 2, wherein said fatty acid salt is a stearate salt.

4. The additive composition of claim 1, further comprising a filler.

5. The additive composition of claim 1, wherein said boric acid is present in an amount of 2 to 20 percent by weight based on the weight of said composition.

6. The additive composition of claim 1, wherein said boric acid is present in an amount of 3 to 14 percent by weight based on the weight of said composition.

7. The composition of claim 1, wherein water is removed from said additive composition.

8. A process for the preparation of the additive composition of claim 1, comprising mixing organopolysiloxane, boric acid, water, and fatty acid salt.

9. The process of claim 8, wherein at least a portion of said water is removed from said additive composition.

10. A pelletizable crosslinkable silicone rubber formulation or component thereof, comprising:
    a) a crosslinkable curable silicone rubber or component thereof; and
    b) the additive composition of claim 1.

11. A pelletizable crosslinkable silicone rubber formulation or component thereof, comprising:
    a) a crosslinkable curable silicone rubber or component thereof; and
    b) the additive composition of claim 2.

12. A pelletizable crosslinkable silicone rubber formulation or component thereof, comprising:
    a) a crosslinkable curable silicone rubber or component thereof; and
    b) the additive composition of claim 5.

13. The pelletizable crosslinkable silicone rubber formulation or component thereof of claim 10, wherein said additive composition comprises 0.2 to 3 percent by weight of said pelletizable crosslinkable silicone rubber formulation or component thereof.

14. The pelletizable crosslinkable silicone rubber formulation or component thereof of claim 10, wherein said silicone rubber is a one component peroxidically crosslinking silicone rubber.

15. The pelletizable silicone rubber formulation or component thereof of claim 10, wherein said component comprises one or more components of a two or more component addition-crosslinking silicone rubber formulation.

16. A free flowing pelletized crosslinkable silicone rubber formulation or component thereof, comprising:
   a) a crosslinkable silicone rubber or component thereof, comprising
      a)i) a peroxidically crosslinkable silicone rubber formulation, or
      a)ii) one or more components of a two or more component addition crosslinkable silicone rubber formulation; and
   b) the components of a pelletizing additive comprising
      b)i) an organopolysiloxane;
      b)ii) boric acid, and
      b)iii) sufficient water to allow admixing b)i and b)ii to form a homogenous boric acid-containing formulation.

17. A process for the preparation of the pelletizable crosslinkable silicone rubber formulation or component thereof of claim 10, said process comprising:
   a) providing a crosslinkable silicone rubber formulation or component thereof;
   b) admixing with a) from 0.2 to 3 percent by weight, based on the weight of a), of a pelletizing additive prepared from organopolysiloxane, boric acid, and water; and
   c) pelletizing said mixture of a) and b) to form free flowing pellets.

18. The process of claim 17, wherein said step of pelletizing takes place by means of an extruder extruding said pelletizable crosslinkable silicone rubber formulation or component thereof through a die with a rotating knife.

19. The process of claim 17, wherein the pelletized produce of said process exhibits a storage stability of six months or more.

20. The additive composition of claim 1 wherein at least one polyorganosiloxane has a viscosity of from $6 \times 10^6$ mPa·s to $9 \times 10^6$ mPa·s.

21. An additive composition suitable for incorporation as a pelletizing aid into a curable silicone rubber formulation, said composition prepared by admixing ingredients comprising a polyorganosiloxane, boric acid, and water.

22. An additive composition suitable for incorporation as a pelletizing aid into a curable silicone rubber formulation, said composition prepared by admixing ingredients comprising a polyorganosiloxane, 8–13 weight % boric acid based on the total weight of the pelletizing additive, and water.

23. The pelletizing additive of claim 22 wherein said polyorganosiloxane is present in an amount of from 30% to 90% by weight based oil the total weight of the pelletizing additive.

24. An additive composition suitable for incorporation as a pelletizing aid into a curable silicone rubber formulation, said composition prepared by admixing ingredients comprising from 30 weight percent to 90 weight percent polyorganosiloxane based on the total weight of the pelletizing additive, boric acid, and water.

25. The pelletizing additive of claim 24 wherein said boric acid is present in an amount of 8 to 13% by weight based on the total weight of said pelletizing additive.

* * * * *

UNITED STATES PATENT AND TRADEMARK OFFICE
CERTIFICATE OF CORRECTION

PATENT NO.     : 6,441,086 B1
DATED          : August 27, 2002
INVENTOR(S)    : Dietrich Wolfer et al.

Page 1 of 1

It is certified that error appears in the above-identified patent and that said Letters Patent is hereby corrected as shown below:

<u>Title page,</u>
Item [54], delete the Title "SILICONE RUBBER" and insert therefor
-- PELLETIZING ADDITIVES, METHOD OF PREPARING SAME, AND SILICONE RUBBER INCORPORATING SAME --.

<u>Column 10,</u>
Line 21, delete "oil" and insert therefor -- on --.

Signed and Sealed this

Eighth Day of April, 2003

JAMES E. ROGAN
*Director of the United States Patent and Trademark Office*